(12) United States Patent
Gentile et al.

(10) Patent No.: US 12,118,311 B1
(45) Date of Patent: Oct. 15, 2024

(54) RESEARCH REPLICABILITY ASSESSMENT

(71) Applicant: Two Six Labs, LLC, Arlington, VA (US)

(72) Inventors: James Gentile, Arlington, VA (US); Chae A. Clark, Arlington, VA (US); Ben Gelman, Arlington, VA (US)

(73) Assignee: Two Six Labs, LLC, Arlington, VA (US)

( * ) Notice: Subject to any disclaimer, the term of this patent is extended or adjusted under 35 U.S.C. 154(b) by 396 days.

(21) Appl. No.: 17/322,096

(22) Filed: May 17, 2021

(51) Int. Cl.
*G06F 40/289* (2020.01)
*G06F 40/169* (2020.01)
*G06F 40/205* (2020.01)
*G06F 40/30* (2020.01)

(52) U.S. Cl.
CPC .......... *G06F 40/289* (2020.01); *G06F 40/169* (2020.01); *G06F 40/205* (2020.01); *G06F 40/30* (2020.01)

(58) Field of Classification Search
None
See application file for complete search history.

(56) References Cited

U.S. PATENT DOCUMENTS

| | | | | |
|---|---|---|---|---|
| 2020/0073902 | A1* | 3/2020 | Milazzo | G06Q 30/0263 |
| 2022/0188514 | A1* | 6/2022 | Thota | G06F 40/253 |

OTHER PUBLICATIONS

Yang, et al. "Estimating the deep replicability of scientific findings using human and artificial intelligence", PNAS, May 19, 2020 (Year: 2020).*
Wu, et al. "Predicting the Reproducibility of Social and Behavioral Science Papers Using Supervised Learning Models", arXiv, Apr. 8, 2021 (Year: 2021).*
Dasigi et al. "Experiment Segmentation in Scientific Discourse as Clause-level Structured Prediction using Recurrent Neural Networks", arXiv, Feb. 17, 2017 (Year: 2017).*
Altmejd, et al. "Predicting the replicability of social science lab experiments", PLOS ONE, Dec. 5, 2019 (Year: 2019).*

* cited by examiner

*Primary Examiner* — Pierre Louis Desir
*Assistant Examiner* — Nicole A K Schmieder
(74) *Attorney, Agent, or Firm* — Armis IP Law, LLC

(57) ABSTRACT

A machine learning approach for evaluating the replicability of research receives a scholarly paper or publication about a research effort, and applies learning models and natural language processing (NLP) to identify replicability of the asserted results. Rule based and machine learning approaches employ models based on preexisting research papers having defined replicability, and compares language features, research parameters and factual assertions extracted from a research paper for evaluation. A pipeline of evaluations and feature extraction analyzes the content of the research paper and renders a prediction value that the described research can be repeated with similar results.

19 Claims, 6 Drawing Sheets

---

ANALYZE THE NARRATIVE REPRESENTATION FOR IDENTIFYING ASSERTIONS MADE BY ONE OR MORE SENTENCES IN THE NARRATIVE REPRESENTATION, THE ANALYSIS BASED ON EXTRACTED NATURAL LANGUAGE FEATURES FROM THE SENTENCES
202

↓

COMPARE THE ASSERTIONS TO ESTABLISHED ASSERTIONS REPRESENTED BY A MODEL OF REPLICABILITY BASED ON PREVIOUS NARRATIVE REPRESENTATIONS
204

↓

BASED ON THE COMPARISON, PREDICT A REPEATABILITY SCORE INDICATIVE OF A LIKELIHOOD OF REPLICATING THE INDENTIFIED ASSERTIONS
206

ANALYZE THE NARRATIVE REPRESENTATION FOR IDENTIFYING ASSERTIONS MADE BY ONE OR MORE SENTENCES IN THE NARRATIVE REPRESENTATION, THE ANALYSIS BASED ON EXTRACTED NATURAL LANGUAGE FEATURES FROM THE SENTENCES
202

COMPARE THE ASSERTIONS TO ESTABLISHED ASSERTIONS REPRESENTED BY A MODEL OF REPLICABILITY BASED ON PREVIOUS NARRATIVE REPRESENTATIONS
204

BASED ON THE COMPARISON, PREDICT A REPEATABILITY SCORE INDICATIVE OF A LIKELIHOOD OF REPLICATING THE INDENTIFIED ASSERTIONS
206

*FIG. 2*

| Paper Reference | Label | Prediction |
|---|---|---|
| (Nosek, Banaji, and Greenwald 2002) Exp, 1 | 1 | 0.70 |
| (Nosek, Banaji, and Greenwald 2002) Exp, 2 | 1 | 0.66 |
| (Soto et al. 2008) | 1 | 0.66 |
| (Monin, Sawyer, and Marquez 2008) | 0 | 0.36 |
| (Purdie-Vaughns et al. 2008) | 0 | 0.31 |
| (Goff, Steele, and Davies 2008) | 0 | 0.27 |
| (Payne, Burkley, and Stokes 2008) | 1 | 0.27 |
| (Shnabel and Nadler 2008) | 0 | 0.25 |
| (Lemay Jr and Clark 2008a) | 0 | 0.24 |
| (Fischer, Greitemeyer, and Frey 2008) | 0 | 0.23 |
| (Lemay Jr and Clark 2008b) | 0 | 0.06 |

RESEARCH REPLICABILITY ASSESSMENT

STATEMENT REGARDING FEDERALLY SPONSORED RESEARCH AND DEVELOPMENT

This invention was made, at least in part, with government support under Contract No. W911NF-20-C-0002. The Government has certain rights in the invention.

BACKGROUND

Research papers serve to document the scholarly efforts of academic and professional endeavors. Publication serves as a medium to evidence achievement and results of research efforts. Many disciplines have established periodicals that respond to requests for publications, and conduct reviews for publication by a network of professional and academic members in the field to which the publication pertains. A so-called "peer review" process is often employed to evaluate and select research papers for publication. The peer review process is often undertaken by reviewers of various levels of experience and with varying levels of scrutiny. While somewhat subjective, such a peer review process often has a substantial bearing on which submitted research papers are ultimately published.

SUMMARY

A system, method and apparatus for evaluating the replicability of research receives a scholarly paper or publication about a research effort, and applies learning models and natural language processing (NLP) to identify replicability of the asserted results. Rule based and machine learning approaches employ models based on preexisting research papers having defined replicability, and compare language features, research parameters and factual assertions extracted from a research paper for evaluation. A pipeline of evaluations and feature extraction analyzes the content of the research paper and renders a prediction value that the described research can be repeated with similar results.

Configurations herein are based, in part, on the observation that in conventional approaches, research is manually peer reviewed by a relatively small number of designated reviewers often donating their time via avenues such as conferences and journals. While manual peer review excels in some regards, conventional approaches suffer from the shortcoming that the variability of reviewer expertise, publication requirements, and research domains brings about multiple levels of variability. Additionally, peer review does not specifically attempt to identify the replicability of research, and, despite the increasing amount of automated analysis tools and replication prediction systems, there have been few changes to the review process over the years.

Accordingly, configurations herein provide a concise prediction value of replicability of the research represented by a candidate research paper. The analysis need only a text or renderable narrative representation of the paper, and applies rule based processing, machine learning models and syntactical analysis to render a prediction of replicability. The replicability of research is significant for building trust in the peer review process and transitioning knowledge to real-world applications. While manual peer review excels in some regards, the variability of reviewer expertise, publication requirements, and research domains brings about uncertainty in the process. In sum, even a favorable peer review may not be a good indicator that the body of research contained in the paper represents a repeatable outcome.

In a particular configuration discussed further below, the method for evaluating replicability of a research paper includes receiving a narrative representation of a research effort, typically a natural language description of the research effort in the form of paragraphs and sentences such as a PDF (Portable Document Format) file containing the printable rendering. The disclosed approach includes analyzing the narrative representation for assertions made by sentences in the narrative representation, in which the analysis is based on extracted natural language features from the sentences. The assertions, or claims of the research paper, are compared to established assertions represented by a model of replicability based on previous narrative representations. From the comparison, a repeatability score is generated representing a likelihood of replicating the identified assertions.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 2 is a flowchart of replicability prediction of a research paper in the environment of FIG. 1;

FIG. 6 shows replication prediction generated by the evaluation of FIG. 5.

DETAILED DESCRIPTION

In conventional review, selection and publication of scholarly documents, research is manually peer reviewed by several (sometimes as few as 3) experts often donating their time through venues such as conferences and journals. However, peer review typically does not specifically attempt to identify the replicability of research.

Determination of replicability at review time is challenging for a multitude of reasons: limited access to data, limited reviewer time, inability to run new experiments, misleading statistics, and a myriad of variables that affect a reviewer's perception of the research, such as the readability of the explanations, clarity and detail of the methodology, significance of the authors' claims, and others. These variables that determine replicability can have varying levels of impact on the decision to accept a paper due to reviewer bias, research domain, and prior standards for acceptance. Not all acceptances of research result from a determination that it is replicable. Mapping these variables to actual replication outcomes can produce a less biased estimation of replicability.

Configurations discussed below describe a method for understanding and predicting replicability given only a PDF of the research while encapsulating a wider, more robust set of factors than conventional approaches. Using a combination of rule-based processing and machine learning models, the approach employs consistent semantic parsing, feature extraction, and replicability classification. In particular, the disclosed approach performs:

Consistent text extraction.
Automated classification of semantic flow.
Multifaceted feature extraction.
Preliminary replication prediction results.

These and other features are demonstrated as accurate predictors of replicability of a research effort documented in a submitted paper, discussed further below.

Figure 1:
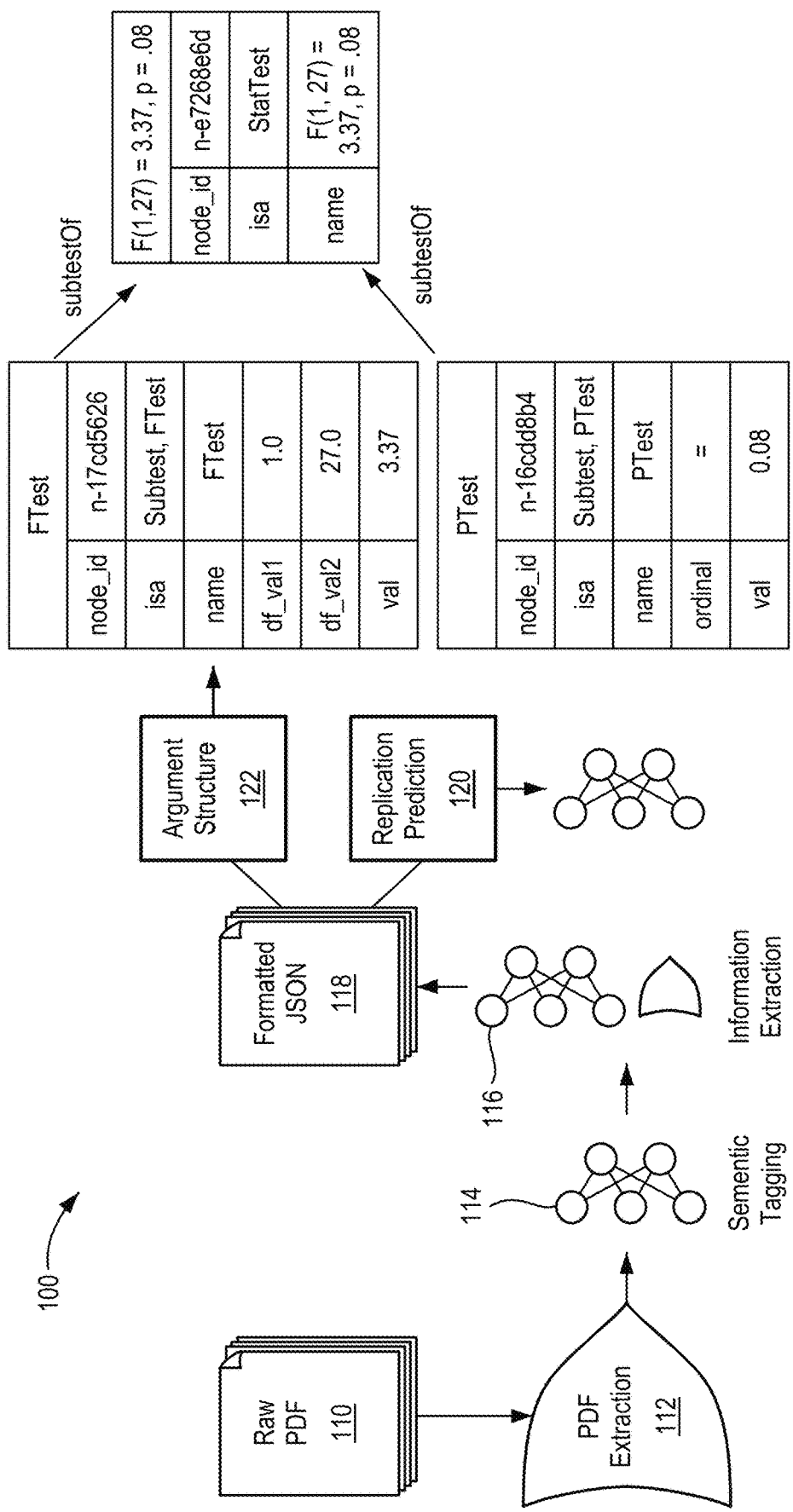
FIG. 1 is a context diagram of a computing environment suitable for use with configurations herein.

FIG. 1 is a context diagram of a computing environment 100 suitable for use with configurations herein. Referring to FIG. 1, a rendering 110 of a narrative representation documenting a research effort is received from an appropriate interface, such as a network connection, file storage, cloud storage and user interface (UI). This may be a PDF of a research paper, which is a typical format often employed for transmission and hardcopy rendering of such papers. From the pdf rendering 110, an extraction 112 of textual contents provides a narrative representation. A NLP (natural language processor) or similar device performs semantic tagging 114 to identify features and attributes of the text, and allows information extraction 116 to coalesce the assertions conveyed by the narrative representation and the context in which it is presented. It should be noted that research documents assert conclusory claims, denoted herein as assertions, about the intended results of the research. Such claims, or assertions, should not be confused with the notion of patent claims about the approach that this application contains.

The features and attributes along with the extracted information about assertions, are employed to generate a formatted version 118 of the narrative representation, such as a file in JSON (Javascript Object Notation) or other hierarchical representation. An ML (Machine Learning) model and corresponding processor, based on a learned training set of previous research paper evaluations, is applied to the formatted version for predicting a replicability score 120 (prediction) indicative of a probability of replicating the described research. An argument structure 122 defining the features and attributes extracted for supporting the assertions made by the narrative representation is also determined.

FIG. 2 is a flowchart of replicability prediction of a research paper in the environment of FIG. 1. Referring to FIGS. 1 and 2, the approach herein is a method for evaluating replicability of a research paper by receiving a narrative representation of a research effort, such that the narrative representation includes a natural language description of the research effort in the form of paragraphs and sentences, and may also include graphics, charts and images. An analysis engine employs ML models and NLP to analyze the narrative representation for identifying assertions made by one or more sentences in the narrative representation, in which the analysis is based on extracted natural language features from the sentences, as depicted at step 202. In other words, based only on a manuscript written in natural language text e.g. English. The analysis engine compares the assertions to established assertions represented by a model of replicability based on previous narrative representations, as shown at step 204, and based on the comparison, predicts a repeatability score indicative of a likelihood of replicating the identified assertions, depicted at step 206. As will be described further below, a replicability prediction of around 65-70% is considered replicable.

Natural Language BERT (Bidirectional Encoder Representations from Transformers; Google®, 2018) has received attention for NLP capabilities in conjunction with ML approaches. None of the conventional approaches has employed such technology in conjunction with a research replicability effort as disclosed herein.

Figure 3:
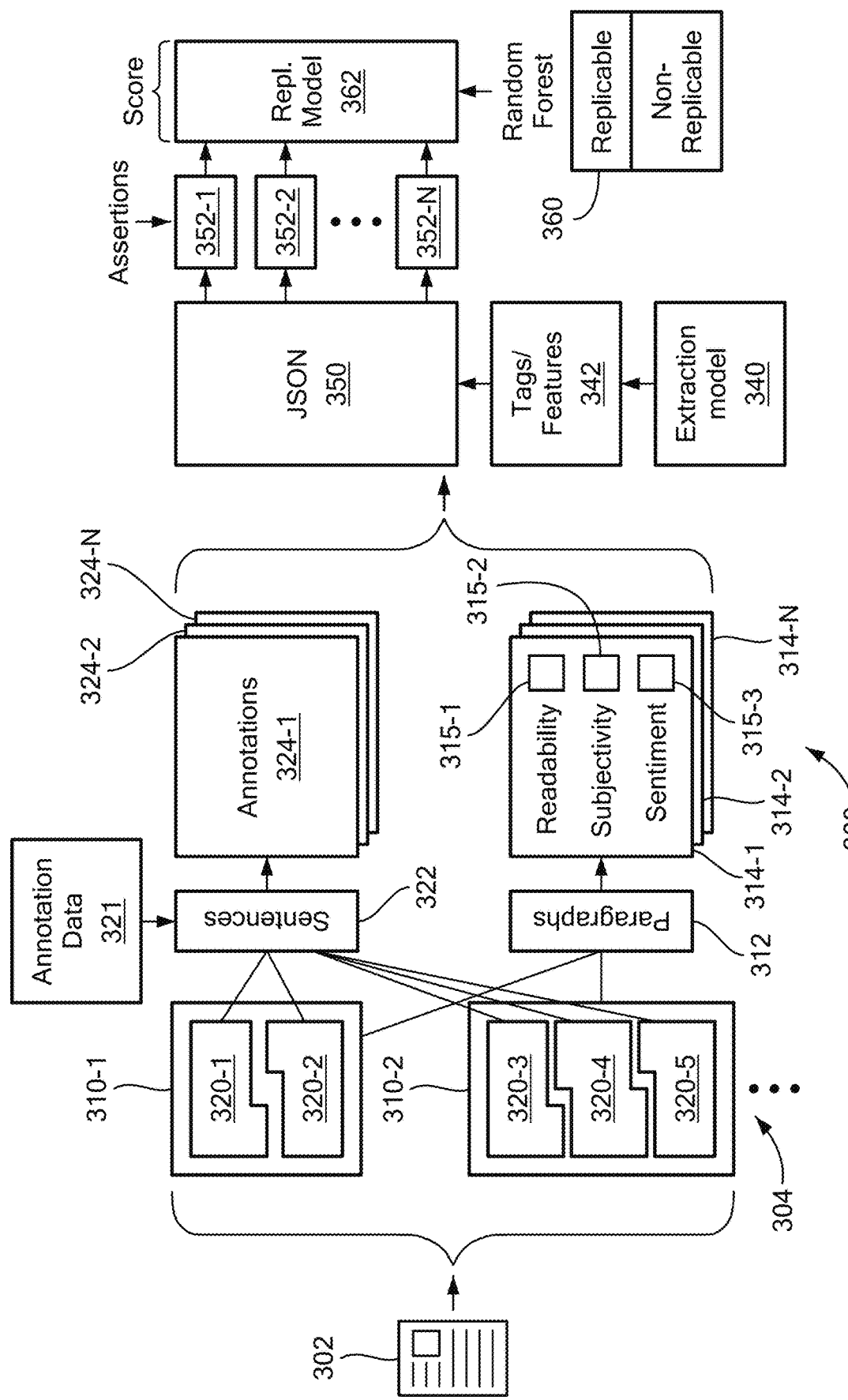
FIG. 3 shows a data flow diagram of the approach of FIG. 2.

FIG. 3 shows a data flow 300 diagram of the approach of FIG. 2. Referring to FIGS. 1-3, the process commences with receiving a page based form of the narrative representation such as a pdf form of the manuscript, and proceeds though the pipeline denoted in FIG. 1 for extracting features and attributes and performing the classification and comparisons for computing replicability. This includes parsing the page based form for extracting textual syntax, and traversing the textual syntax for generating a hierarchical form of the narrative representation for receiving associations of features and attributes. Analyzing the narrative representation 302 therefore further includes transforming the narrative representation 302 into a parseable version 304 of the narrative representation defined by a hierarchical script. The hierarchical script separates graphical material from textual information. Extracting the text from a PDF and formatting it into informative segments facilitate natural language approaches. The disclosed example runs a PDF to RTF extraction tool. The RTF files maintain formatting information, and a utility converts the RTF files to HTML files, which have a hierarchical structure that is more amenable to rule-based processing. Other text and parsing mediums may be employed, however.

Rules are applied to the extraction because it can be an erroneous process that fails around artifacts such as tables, captions, or footnotes. The HTML representations are each parsed into a hash map where the keys are content styles and the values are all concatenated words and white-spaces of that style in the order they appear. The main content string of the paper is identified as the longest value, by character count, in this hash map. The main content string is employed for subsequent processing.

From the extraction, paragraphs 310-1 . . . 310-2 (310 generally) and sentences 320-1 . . . 320-5 (320 generally) are now delineated; actual research papers likely contain many more paragraphs and sentences than this example. Annotations are made by an annotation model 322 that classifies each of the sentences 320 as belonging to one of a plurality of contexts, and results in annotating each of the sentences 320 with a tag based on the classification. The annotations include the following:

Introduction: Problem statement and paper structure.
Methodology: Specifics of the study, including participants, materials, and models.
Results: Experimental results and statistical tests.
Discussion: Author's interpretation of results and implications for the findings.
Research Practice: Conflicts of interest, funding sources, and acknowledgements.
Reference: Citations.

Annotation training data 321 trains the annotation model 322 for generating the annotated sentence data 324-1 . . . 324-N (324 generally) in the form of annotation data associated with each sentence 324.

Analyzing the narrative representation 302 further includes applying a set of natural language rules 312 to each of the sentences and paragraphs of the parseable version 304. Based on the natural language rules, the natural language rules 312 are used to compute, for each paragraph 320, a metric of readability 315-1, subjectivity 315-2 and sentiment 315-3 (315 generally). The computed metrics 315 for readability, subjectivity and sentiment are associated with the features 314-1 for the respective paragraph 320. The process continues for features 314-N of each respective paragraph 310.

Features and attributes associated with sentences and paragraphs are now assembled, as shown by annotations 324 and metrics 314, respectively. These will both be employed in identifying the assertions promoted by the narrative representation. 302. Assertions are identified by generating an extraction model 340 indicative of research claims made in a previous narrative representation. This results from training the extraction model 340 based on claims (assertions) made in previous research papers and publications. Application of the model 340 of research claims to the narrative representation determines, for each sentence 320, if the sentence defines an assertion, and if so, computes a score for each of a summary claim, results claim, concrete hypothesis and test specification. The resulting scores define assertion features 342 associated with the respective sentence. The score for each of summary, results, hypothesis and test will be employed below for evaluating the assertion. Assertion features 342, sentence features (including annotations 324) and paragraph features (including scores 314) are combined in a hierarchical script form such as a JSON file 350 for replicability analysis. The JSON file 350 includes a plurality of assertions 352-1 . . . 352-N (352 generally), in context with the features and attributes of the other sentences and paragraphs in the research paper, for replicability analysis.

Replicability analysis includes generating a replicability model 362 by retrieving a set of previous narrative representations based on published research papers, and identifying, for each of the previous narrative representations in the set, whether each of the previous narrative representations represents replicable or non-replicable research. In the example configuration, a random forest model is trained to classify the replicability of papers. The training dataset 360 is a collection of papers from publications such as the Journal of Experimental Psychology to separate the replicable and non-replicable experiments.

As the replication evaluation includes studies performed by different groups, there is variability in the number of features available in the given data. Many contain simple statistics such as sample size, but only a relatively few contain p-values. An ideal dataset includes features related to the number and significance of p-values reported, a proxy to the number of figures present, the presence of effect size, and the presence of an appendix. Other training datasets may be employed. At a minimum, the replicability training set 360 defines papers as replicable and non-replicable.

In an example configuration as discussed herein, the training set trains a binary random forest classifier to predict the replicability of an experiment. About 5000 estimators are employed with a maximum depth of 3. A number of the papers are selected for use as the evaluation set. Predictions employ an experimental p-value and the presence of effect size (binary).

For analysis/production, the replicability model 362 is invoked, for each assertion 352, to apply the replicability model based on replicable and non-replicable assertions in the previous narrative representations, and to compute, based on an aggregation of the model 362 applied to each of the assertions 352, a score indicative of whether the narrative representation represents replicable research. In other words, the aggregate assertions 352 identified in a particular narrative representation are employed to determine replicability.

Approaching a large body of textualized knowledge encapsulated in a research paper typically involves a parsing utility and/or text analysis operations for extracting the raw semantic data and identifying grammatical portions and types, This may include identifying the portions and assigning a tag based on a type determination, such as a numerical reference, a range, a reason or conclusion, for example, used to classify and assign the tags. Any suitable parsing approach may be employed; an example of parsing is shown in FIGS. 4 and 5 below.

Figure 4:
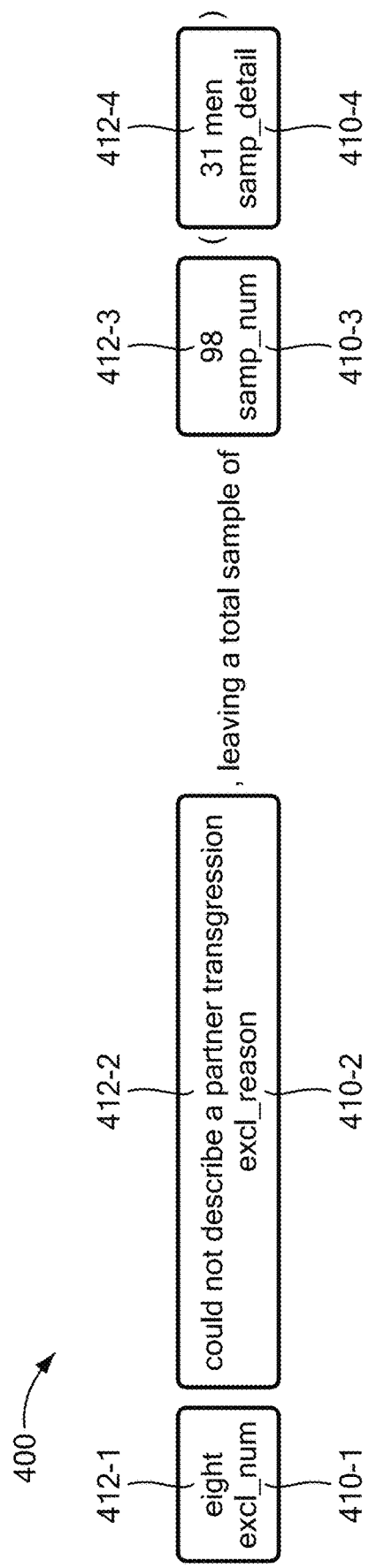
FIG. 4 shows information extraction from a research paper for evaluating an assertion according to the data flow of FIG. 3.

FIG. 4 shows a particular example of one approach for parsing and information extraction from a research paper for evaluating an assertion according to the data flow of FIG. 3. Referring to FIGS. 3 and 4, FIG. 4 shows an example phrase or sentence 320 extracted from a paper and determined to represent an assertion 400 or claim of the paper. For each sentence 320 identified as an assertion 400, the model 362 parses the sentence for identifying tags, aggregates a set of the tags identified in the parsed sentence, and for each of the identified tags, stores the identified tag. and a sentence portion to which the tag applies, in association with the sentence. Identified assertion features 342 are denoted by tags 410-1 . . . 410-4 assigned to respective attribute values 412-1 . . . 412-4 defined by the sentence portion for replication analysis by the replication model 362.

Figure 5:
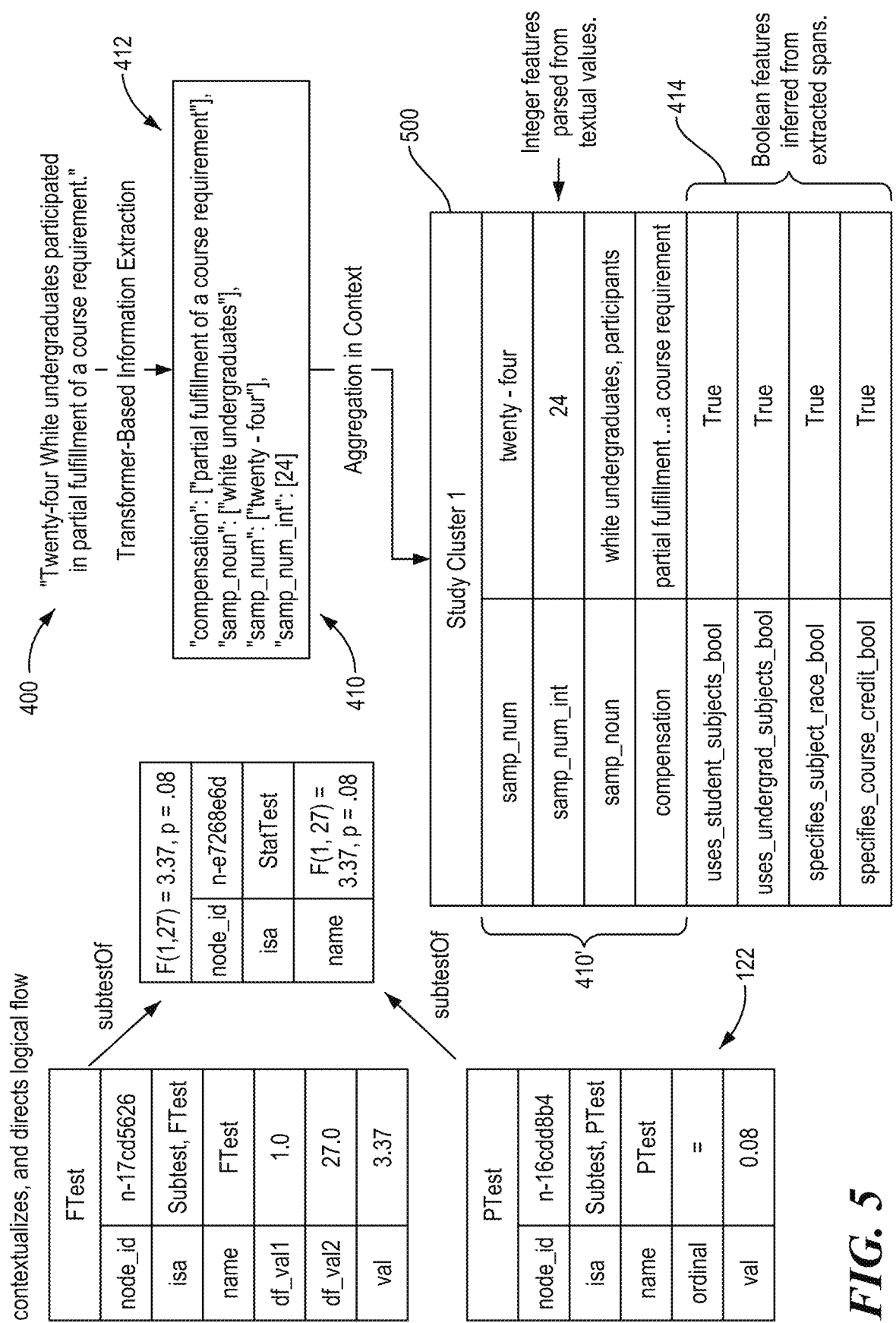
FIG. 5 shows an evaluation of the assertions as in FIG. 4 for computing replicability of the assertions of the research paper.

FIG. 5 shows one example of an evaluation of the assertions as in FIG. 4 for computing replicability of the assertions of the narrative representation 302. In production, the model 362 classifies, for each assertion 400-1, quantitative references in the sentence, and determines the tag 410 associated with the quantitative reference (attribute value 412). A classification entry 500 aggregates the tags 410' and associated quantitative references 412' for each sentence, and assigns one or more Boolean tags 414 to the aggregated tags based on an inferred context of the sentence in the narrative representation. Concurrently, the argument structure 122 is also derived.

FIG. 6 shows replication prediction generated by the evaluation of FIG. 5. During test and production of the replication model 362, sentences defined as assertions are extracted from papers. For each assertion 400, a sample size and an effect size is computed, and based on the assertion, the sample size and the effect size, the model 362 computes a p-value (prediction) indicative of a likelihood of a condition expressed by the assertion from occurring randomly. In other word, but for the accuracy of the assertion, would the stated condition have occurred? For each research paper 610 documenting a research effort, a prediction 612 of replicability is generated based on the model 362. A higher prediction, above a certain threshold (about 65%) can generally be taken as an indication that the research conclusions arrived at by the paper 610 can be repeated, indicating a correlation of 10 of 11 based on a label 614 of actual replication efforts.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as solid state drives (SSDs) and media, flash drives, floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions, including virtual machines and hypervisor controlled execution environments. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method for evaluating replicability of a research paper, comprising:
   receiving a narrative representation of a research effort, the narrative representation including a natural language description of the research effort in the form of paragraphs and sentences;
   computing, for each paragraph, a metric of readability, subjectivity and sentiment; and
   associating the computed metrics for readability, subjectivity and sentiment with a set of features for each respective paragraph;
   analyzing the narrative representation for identifying assertions made by one or more sentences in the narrative representation, the analysis based on extracted natural language features from the sentences, identifying the assertions further comprising:
      generating a model of research claims made in a previous narrative representation by training the model of research claims based on features defined by the plurality of sentences;
      applying the trained model of research claims to the narrative representation for determining, for each sentence of a plurality of sentences, if the sentence defines an assertion, and if so, computing a score for each of a summary claim, results claim, concrete hypothesis and test specification; and
      associating the computed scores with the features for each respective sentence of the plurality of sentences;
   combining the features for each respective paragraph with the features and the computed scores for each respective sentence in a hierarchical script;
      comparing the assertions to established assertions represented by a replicability model of previous narrative representations based on features of both the paragraphs and the plurality of sentences; and
      based on the comparison, predicting a repeatability score indicative of a likelihood of replicating the identified assertions.

2. The method of claim 1 wherein analyzing the narrative representation further comprises:
   transforming the narrative representation into a parseable version of the narrative representation defined by the hierarchical script, the hierarchical script separating graphical material from textual information;
   classifying each of the sentences as belonging to one of a plurality of contexts; and
   annotating each of the sentences with a tag based on the classification.

3. The method of claim 1 wherein analyzing the narrative representations further comprises:
   applying a set of natural language rules to each of the sentences of the plurality of sentences.

4. The method of claim 1 further comprising:
   receiving a page based form of the narrative representation;
   parsing the page based form for extracting textual syntax from the page based form; and
   traversing the textual syntax for generating a hierarchical form of the narrative representation for receiving associations of features and attributes.

5. The method of claim 1 further comprising:
   for each assertion, applying the replicability model based on replicable and non-replicable assertions in the previous narrative representations;
   computing, based on an aggregation of the replicability model applied to each of the assertions, a score indicative of whether the narrative representation represents replicable research.

6. The method of claim 5, further comprising:
   generating the replicability model by:
   retrieving a set of previous narrative representations based on published research papers; and
   identifying, for each of the previous narrative representations in the set, whether each of the previous narrative representations represents replicable or non-replicable research.

7. The method of claim 1 further comprising:
   for each sentence defined as an assertion, receiving, based on parsing the sentence, tags;
   aggregating a set of the tags identified in the parsed sentence; and
   for each of the identified tags, storing the identified tag, and a sentence portion to which the tag applies, in association with the sentence.

8. The method of claim 5 further comprising:
   receiving, for each assertion, identified quantitative references in the sentence;
   receiving a tag associated with the quantitative reference;
   aggregating the tags and associated quantitative references for each sentence; and
   assigning one or more Boolean tags to the aggregated tags based on a context of the sentence in the narrative representation.

9. The method of claim 1 further comprising:
   for each assertion, computing a sample size and an effect size, and based on the assertion, the sample size and the effect size, computing a p-value indicative of a likelihood of a condition expressed by the assertion from occurring randomly.

10. A computing device for evaluating replicability of a research paper, comprising:
    an interface to receive a narrative representation of a research effort, the narrative representation including a natural language description of the research effort in the form of paragraphs and sentences;
    a natural language processor (NLP) configured to analyze the narrative representation for identifying assertions made by a plurality of sentences in the narrative representation, the analysis based on extracted natural language features from the sentences;
    a machine learning (ML) processor responsive to the interface to compare the assertions to established assertions represented by a replicability model of previous narrative representations based on features of both the paragraphs and the plurality of sentences, the MP processor configured to:

compute, for each paragraph, a metric of readability, subjectivity and sentiment; and associate the computed metrics for readability, subjectivity and sentiment with a set of features for each respective paragraph, identifying the assertions further comprising:

generating a model of research claims made in a previous narrative representation by training the model of research claims based on features defined by the plurality of sentences;

applying the trained model of research claims to the narrative representation for determining, for each sentence of a plurality of sentences, if the sentence defines an assertion, and if so, computing a score for each of a summary claim, results claim, concrete hypothesis and test specification; and associating the computed score with the features for each respective sentence of the plurality of sentences;

combining the features for each respective paragraph with the features and the computed score for each respective sentence in a hierarchical script; and a UI rendering to, based on the comparison, render a prediction of a repeatability score indicative of a likelihood of replicating the identified assertions.

11. The device of claim 10 wherein the NLP is programmed to analyze the narrative representation by:

transforming the narrative representation into a parseable version of the narrative representation defined by the hierarchical script, the hierarchical script separating graphical material from textual information;

classifying each of the sentences as belonging to one of a plurality of contexts; and annotating each of the sentences with a tag based on the classification.

12. The device of claim 10 wherein the NLP is further programmed to:

apply a set of natural language rules to each of the sentences of the plurality of sentences.

13. The device of claim 10 wherein the NLP is further programmed to:

receive a page based form of the narrative representation;

parse the page based form for extracting textual syntax from the page based form; and traverse the textual syntax for generating a hierarchical form of the narrative representation for receiving associations of features and attributes.

14. The device of claim 10 wherein the ML processor is programmed to:

generate the model of research claims made in a previous narrative representation;

apply the model of research claims to the narrative representation for determining, for each sentence of the plurality of sentences, if the sentence defines an assertion, and if so, computing a score for each of a summary claim, results claim, concrete hypothesis and test specification; and associate the determined score with the features for the respective sentence of the plurality of sentences.

15. The device of claim 14 wherein the ML processor is programmed to:

for each assertion, apply a replicability model based on replicable and non-replicable assertions in the previous narrative representations; and compute, based on an aggregation of the replicability model applied to each of the assertions, a score indicative of whether the narrative representation represents replicable research.

16. The device of claim 15 wherein the ML processor is programmed generate the replicability model by:

retrieving a set of previous narrative representations based on published research papers;

identifying, for each of the previous narrative representations in the set, whether each of the previous narrative representations represents replicable or non-replicable research.

17. The device of claim 14 wherein the NLP is further programmed to:

for each sentence defined as an assertion, parse the sentence for identifying tags;

aggregate a set of the tags identified in the parsed sentence; and for each of the identified tags, store the identified tag, and a sentence portion to which the tag applies, in association with the sentence.

18. The device of claim 15 wherein the NLP processor is further programmed to:

for each assertion, identify quantitative references in the sentence;

determine a tag associated with the quantitative reference;

aggregate the tags and associated quantitative references for each sentence; and assign one or more Boolean tags to the aggregated tags based on a context of the sentence in the narrative representation.

19. A computer program embodying program code on a non-transitory medium that, when executed by a processor, performs steps for implementing a method of evaluating document research efforts for replicability, the method comprising:

parsing a narrative representation of a research effort, the narrative representation including a plurality of sentences arranged in a plurality of paragraphs of the sentences;

computing, for each paragraph of the plurality of paragraphs, a metric of readability, subjectivity and sentiment; and associating the computed metrics for readability, subjectivity and sentiment with a set of features for each respective paragraph;

classifying each of the sentences as belonging to one of a plurality of contexts;

identifying natural language features indicative of a language quality of each paragraph of the plurality of paragraphs;

identifying, based on the natural language features, sentences containing assertions of the narrative representation, the assertions designating an outcome result of the narrative representation, identification of the assertions further comprising:

generating a model of research claims made in a previous narrative representation by training the model of research claims based on features defined by the plurality of sentences;

applying the trained model of research claims to the narrative representation for determining, for each sentence of a plurality of sentences, if the sentence defines an assertion, and if so, computing a score for each of a summary claim, results claim, concrete hypothesis and test specification; and associating the computed score with the features for each respective sentence of the plurality of sentences; and combining the features for each respective paragraph with the features and the computed score for each respective sentence in a hierarchical script;

comparing the assertions to established assertions represented by a model of replicability of previous narrative representations based on features of both the paragraphs and the plurality of sentences;

evaluating, for each of the assertions, a probability indicative of a random effect causing the outcome result; and aggregating, based on the comparisons, each of the evaluated assertions based on a sample size and an effect size on which the outcome was based, for computing a replication probability of the respective assertions in the narrative representation.

\* \* \* \* \*